UNITED STATES PATENT OFFICE.

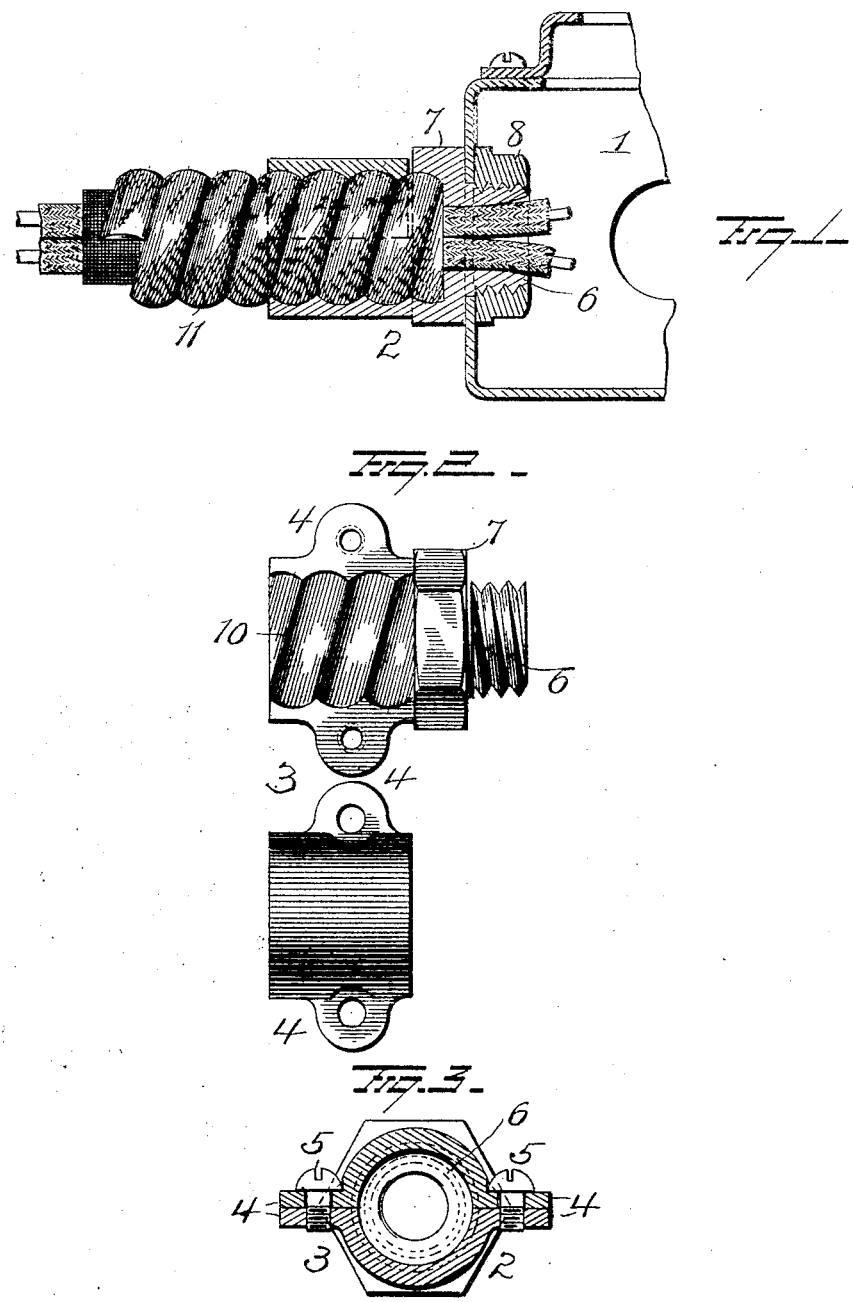

WILLIAM S. BROWN, OF NEW YORK, N. Y.

COUPLING FOR CONDUITS.

No. 804,204.          Specification of Letters Patent.          Patented Nov. 14, 1905.

Application filed April 15, 1905. Serial No. 255,824.

*To all whom it may concern:*

Be it known that I, WILLIAM S. BROWN, a resident of New York, in the county of New York and State of New York, have invented certain new and useful Improvements in Couplings for Conduits; and I do hereby declare the following to be a full, clear, and exact description of the invention, such as will enable others skilled in the art to which it appertains to make and use the same.

My invention relates to an improved coupling for connecting armored cables or conduits with a connection-box; and it consists in certain novel features of construction and combination of parts, as will be more fully explained, and pointed out in the claims.

In the accompanying drawings, Figure 1 is a view in section through a part of connection-box and my improved coupling, the end of an armored cable being shown therein in elevation. Fig. 2 is a view in elevation of the coupling, the top section of the coupling being removed; and Fig. 3 is a view in transverse section through the coupling.

1 represents a connection-box of any approved form having openings in its sides for the attachment of the coupling 2. Each coupling 2 comprises a nipple 6, designed to pass through an opening in the side of the box 1, an enlarged section 7, having an angular periphery, as shown, so as to permit it to be engaged by a wrench, and a two-part sleeve 3, one part of the sleeve being integral with the nipple 6 and enlarged section 7 and the other section of said sleeve being detachable. The two sections when assembled form a cylindrical sleeve designed to receive the end of an armor or conduit carrying a cable or cables.

The lower or fixed section of the sleeve 3 is provided with laterally-projecting ears 4, having screw-threaded holes therein, which latter aline with plain openings in similar ears 4, integral with the removable section of the sleeve, the two sections being secured together by screws passing through the ears on the removable section and engaging the threads in the ears of the lower integral section of the sleeve.

Both sections of the sleeve and a portion of the section 7 are provided with internal rounded grooves, which when the sections are assembled form a continuous internal thread designed to conform to or engage the end of the armor or conduit and firmly hold the same in place.

As shown in Fig. 1, the nipple 6 is passed through an opening in the box and is secured in place by nut 8, screwed onto said nipple, or, if desired, the nipple may be screwed into a threaded opening in the box.

To secure an armored cable therein, the coupling is secured to the box in either of the ways described, the removable section of the sleeve being detached.

The bore through the section 7 and nipple 6 is smaller than the internal diameter of the sleeve, but is sufficiently large to receive the cable or cables. With the upper section of the sleeve removed the end of the cable can be readily entered in the bore of the nipple and the armor can be temporarily secured by forcing or screwing it into the threaded recess in the enlarged section 7. After the parts have been thus assembled and the contents lined up they may be permanently connected by securing the upper section of the sleeve to the fixed section by the screws 5.

Having fully described my invention, what I claim as new, and desire to secure by Letters Patent, is—

1. A coupling of the character described consisting of an externally-threaded nipple, a two-part sleeve, the latter having an internal spiral thread or groove, and an intermediate enlarged section integral with the nipple and one section of the sleeve, the said intermediate section having a recess provided with a groove or thread continuous with the groove or thread in the sleeve.

2. A coupling of the character described, consisting of an externally-threaded nipple, a two-part sleeve having an internal spiral thread or groove, and an intermediate enlarged section integral with the nipple and one section of the sleeve, the said intermediate section being provided with a recess having a groove or thread continuous with the groove or thread in the sleeve, the said nipple, being provided with a bore communicating with the recess in the intermediate section.

In testimony whereof I have signed this specification in the presence of two subscribing witnesses.

WILLIAM S. BROWN.

Witnesses:
     ALEXANDER A. MCFARLANE,
     ERNEST M. FENTON.